(12) United States Patent
Rudd et al.

(10) Patent No.: US 8,309,146 B2
(45) Date of Patent: Nov. 13, 2012

(54) DEER ATTRACTANT AND NUTRIENT

(76) Inventors: Roger Rudd, Stillwater, OK (US);
Edgar R. Welch, Marland, OK (US)

( * ) Notice: Subject to any disclaimer, the term of this patent is extended or adjusted under 35 U.S.C. 154(b) by 0 days.

(21) Appl. No.: 13/168,982

(22) Filed: Jun. 26, 2011

(65) Prior Publication Data
US 2011/0318448 A1  Dec. 29, 2011

Related U.S. Application Data

(60) Provisional application No. 61/358,802, filed on Jun. 25, 2010, provisional application No. 61/361,875, filed on Jul. 6, 2010.

(51) Int. Cl.
*A23K 1/18* (2006.01)
(52) U.S. Cl. .............. 426/1; 426/74; 426/615; 426/807
(58) Field of Classification Search ............. 426/1, 74, 426/615, 807
See application file for complete search history.

(56) References Cited

U.S. PATENT DOCUMENTS 6,572,903 B1 *   6/2003  Fuhr et al. .................. 426/73
2010/0227021 A1 *   9/2010  Arnold ........................ 426/2

OTHER PUBLICATIONS

Bio-Tec Research, Inc. "Why Choose Critical Mass??", downloaded from www.deerfood.com/critical_mass.php dated Apr. 26, 2008, 4 pages.*
Shaw et al. Journal of The Tennessee Acad. Sci., vol. 82(3-4), pp. 83-87, Jul.-Oct. 2007.*
Asleson et al. J. Wildlife Management, vol. 60 (No. 4), pp. 744-752, 1996.*
Silven, "Attract Deer with Soybeans", dated May 28, 2009, downloaded from http://www.bukisa.com/articles/101611_attract-deer-with-soybeans, 2 pages.*
"HaveMoreDeer 100% All Natural Deer Attractant" downloaded from www.havemoredeer.com/, dated Dec. 19, 2005, 1 page.*
Tradition Deer Feeds downloaded from www.hubbardfeeds.com dated Jan. 21, 2008, 4 pages.*

* cited by examiner

*Primary Examiner* — Chhaya Sayala
(74) *Attorney, Agent, or Firm* — Martin S. High, P.C.

(57) ABSTRACT

The embodiments of the Deer Attractant and Nutrient is a deer attractant and feed comprising rice hulls; calcium carbonate; manganese; copper sulfate; zinc sulfate; trace amounts of cobalt carbonate; EDDI; mono DICAL; selenium; and power sweet. Because of the balanced nutritional components of the Deer Attractant and Nutrient the product enhances overall deer growth including antler growth in bucks. The Deer Attractant and Nutrient also acts as a deer attractant, causing the deer to move toward a supply of the attractant.

1 Claim, No Drawings

DEER ATTRACTANT AND NUTRIENT

CROSS-REFERENCE TO RELATED APPLICATIONS

This application claims priority of the following provisional patents applications: provisional patent application with Ser. No. 61/358,802 titled "Deer Attractant and Nutrient" filed on Jun. 25, 2010, and provisional patent application with Ser. No. 61/361,875 titled "Deer Attractant and Nutrient" filed on Jul. 6, 2010. The entire contents of provisional applications 61/358,802 and 61/361,875 are herein incorporated by reference.

STATEMENT REGARDING FEDERALLY SPONSORED RESEARCH OR DEVELOPMENT

Not applicable

FIELD OF THE EMBODIMENTS

The field of the embodiments is animal attractants containing sufficient nutritional supplements to enhance the growth of the animals. More specifically, the field of the embodiments is deer attractants containing sufficient nutritional supplements to enhance the growth of the deer including the size of the muscular and bone structures of the deer including the antlers.

BACKGROUND OF THE EMBODIMENTS

Deer hunters commonly provided seed and nutrients for their deer throughout the year. This includes during times outside of the regular hunting season. It is quite common for hunters to provide nutrients as well as food to the deer all throughout the year. In fact, it is quite common for deer hunters to provide a majority of the nutritional needs to their quarry. If this is the case, it is very important for the food that is provided to the deer to be applied nutritional value so that the deer grow properly. Therefore it is important not only to provide calories to the deer, but also minerals and vitamins. There are a number of studies that showed that providing minerals, vitamins, and other essential trace components to the deer greatly enhances the health and therefore the number of points in the antlers or rack grown by the deer.

SUMMARY OF THE EMBODIMENTS

The embodiments described in the instant application are for animal attractants containing sufficient nutritional supplements. Specifically, the embodiments are directed to deer attractants containing nutritional supplements to enhance the growth of the deer including the size of the muscular and bone structures of the deer including the antlers.

BRIEF DESCRIPTION OF THE DRAWINGS

Table 1 is a listing of a preferred embodiment of the Deer Attractant and Nutrient showing composition ranges of the components of the preferred embodiment.

DETAILED DESCRIPTION OF THE PREFERRED EMBODIMENTS

Embodiments of the Deer Attractant and Nutrient provide those caloric value and nutritional value to deer in an easy to use form. The embodiments are comprised of rice hulls, calcium carbonate; manganese; copper sulfate; zinc sulfate; cobalt carbonate; EDDI (ethylenediamine dihydroiodide); dicalcium phosphate (calcium monohydrogen phosphate); selenium; power sweet; milo, corn and soybean. The resulting mixture has a protein content of of approximately 16%.

In one method of blending the The embodiments are produced by first milling the rice hulls. Then the calcium carbonate; manganese; copper sulfate; zinc sulfate; cobalt carbonate; EDDI (ethylenediamine dihydroiodide); dicalcium phosphate; selenium are added to the rice hulls and the resulting composition is well mixed. EDDI is defined as a food preservative that can be added to embodiments to prevent the material from decomposing readily and is also a source of iodine. Finally, the power sweet is blended into the rice hull mixture and then this mixture is blended with the milo, corn and soybean. Mixing and blending this with the milo, corn and soybean is performed using industrial sized and powered solids handling and blending equipment.

In a preferred embodiment of the Deer Attractant and Nutrient, the composition of the material is comprised of the ranges provided in Table 1.

The best mode of use of the Deer Attractant and Nutrient is to place the material into a commercially available deer feeder which may be automated to feed a preset amount onto the ground. The deer feeder automatically dispense the attractant in the predetermined quantity at the predetermined time.

TABLE 1

Approximate Composition of Preferred Embodiment

| | |
|---|---|
| 2.0-3.0% | rice hulls |
| 2.0-2.5% | calcium carbonate |
| 0.5-1.5% | manganese |
| 0.25-0.5% | copper sulfate |
| 0.5-1.5% | zinc sulfate |
| ~0.002% | cobalt carbonate |
| 0.02-0.05% | EDDI (ethylenediamine dihydroiodide) |
| 15.0-20.0% | dicalcium phosphate (calcium monohydrogen phosphate) |
| 0.1-0.2% | selenium |
| 0.1-0.2% | power sweet |
| ~50% | corn |
| ~30% | milo |
| ~20% | soybean |

What we claimed is:

1. A deer attractant and nutritional supplement consisting of 2 to 3% rice hulls; 20 to 25% calcium carbonate; 0.5 to 1.5% manganese; 0.25 to 0.5% copper sulfate; 0.5 to 1.5% zinc sulfate; approximately 0.002% cobalt carbonate; 0.02 to 0.05% ethylenediamine dihydroiodide; 15 to 20% calcium monohydrogen phosphate; 0.1 to 0.2% selenium; 0.1 to 0.2% power sweet; approximately 30% milo;
   approximately 20% soybean; and the balance of the deer attractant and nutritional supplement, which is approximately 50%, is corn.

* * * * *